Patented June 29, 1954

2,682,507

UNITED STATES PATENT OFFICE 2,682,507

SILICONE OILS HAVING LOW VISCOSITY-TEMPERATURE COEFFICIENTS

Maynard C. Agens, Schenectady, N. Y., assignor to General Electric Company, a corporation of New York No Drawing. Application December 15, 1952, Serial No. 326,163

3 Claims. (Cl. 252—37.2)

This invention is concerned with silicone oils of low viscosity-temperature coefficients. More particularly, the invention relates to organopolysiloxane fluids having low viscosity-temperature coefficients especially between temperatures of 100° F. and 210° F., the said fluids comprising a liquid methyl phenyl polysiloxane containing an average of from about 2.0 to 2.25 total methyl and phenyl groups per silicon atom, and from about 5 to 15 per cent, by weight, based on the weight of the organopolysiloxane, of a homogeneously incorporated organometallic salt of the class consisting of aluminum and copper sebacates.

Silicone oils are generally known to have low viscosity-temperature coefficients. Thus, a linear trimethylsilyl chain-stopped methly polysiloxane fluid is known to have a viscosity temperature coefficient of about 0.6. Methyl phenylpolysiloxanes in which there may be both methyl and phenyl groups on the same silicon atom or there may be present both diphenylsiloxy and dimethylsiloxy units in addition to the terminal trihydrocarbon substituted silicon atoms, have been found to have viscosity temperature coefficients ranging from about 0.8 to 0.9. This is evidenced by the fact that when methyl phenyl polysiloxane oils are subjected to elevated temperatures, the viscosity of the oil decreases fairly rapidly as compared to straight methyl polysiloxane oils containing only methyl groups as the silicon-bonded organic radical.

The liquid organopolysiloxanes with which the present invention is concerned are useful because of their resistance to decomposition at elevated temperatures and also because they are capable of remaining liquid at relatively low temperatures. In addition, although these materials have viscosity temperature coefficients comparable to the viscosity temperature coefficients of hydrocarbon oils, nevertheless in applications involving, for example, the use of these materials as hydraulic fluids, for which silicone oils are eminently suitable, it is advantageous to keep the viscosity temperature coefficient as low as possible in order to permit operation of these fluids in various applications at both high and low temperatures without any requirement for adjustment of mechanisms due to changes in viscosity of the hydraulic fluid.

I have now discovered that methyl phenyl silicone oils which can be advantageously employed as hydraulic fluids or as lubricants can be improved so that their viscosity temperature coefficients are even lower than has heretofore been possible to obtain, by incorporating therein minor proportions of either copper sebacate or aluminum sebacate in the oil. By means of the use of copper or aluminum sebacate, I have been able to obtain viscosity temperature coefficients ranging from $\frac{1}{2}$ to $\frac{1}{3}$ of the usual coefficients of these silicone fluids alone. That the liquid methyl phenyl polysiloxane would still be fluid even after the incorporation of from 5 to 15 per cent, by weight, of aluminum or copper sebacate was entirely unexpected and in no way could have been predicted since it would be supposed that aluminum or copper sebacate would thicken the fluid to a point that there would be no advantage and there might be some disadvantages at the temperatures at which the liquid organopolysiloxane might be employed.

Many of the liquid methyl and phenyl polysiloxanes with which the present invention are concerned are found described and claimed in Patnode Patents 2,469,888 and 2,469,890, both issued May 10, 1949. By reference, these two patents are made part of the disclosures of the present application. The liquid organopolysiloxanes employed in the practice of the present invention may be obtained, for example, by effecting reaction in the presence of sulfuric acid between hexamethyl disiloxane and either (a) the hydrolysis product of methyl phenyldichlorosilane or (b) the cohydrolysis product of dimethyldichlorosilane and diphenyldichlorosilane or (c) the hydrolysis product of dimethyldichlorosilane, methyl phenyldichlorosilane, and diphenyldichlorosilane, each of the hydrolysis products, if desired having intercondensed monophenylsiloxy units or monomethylsiloxy units, or triphenylsiloxy units, or trimethylsiloxy units, depending on the ratio of silicon-bonded organic groups to silicon atoms desired.

In order that those skilled in the art may better understand how my present invention may be practiced the following examples are given by way of illustration and not by way of limitation. All parts are by weight.

EXAMPLE 1

Aluminum sebacate was prepared by first neutralizing with sodium hydroxide a sebacic acid solution in alcohol to a phenolphthalein end point. A solution of alum was added to the sodium sebacate solution, and the aluminum sebacate precipitated. This precipitate was washed, filtered and dried.

About 20 parts of the above-identified aluminum sebacate was mixed with 40 parts of a trimethylsilyl chain-stopped methyl phenyl polysiloxane containing about ¾%, by weight, thereof tertiary butyl phenyl phenol as an oxidation inhibitor. This mixture was milled on a three-roll paint mill until an intimate mixture of grease consistency was obtained. The mixture was then placed in an oven and heated until the temperature reached about 190° C. It was thereafter removed and again milled to insure intimate dispersion of the aluminum sebacate in the methyl phenyl organopolysiloxane. Thereafter, additional amounts of the methyl phenyl polysiloxane were added until the aluminum sebacate comprised about 10% of the total weight of the aluminum sebacate and the liquid methyl phenyl polysiloxane. Further milling on the three-roll paint mill gave a viscous fluid which was translucent in thin films. This composition was quite stable and showed no evidence of settling out even after standing for about seven months.

The viscosity of this liquid was then measured at both 100° F. and 210° F. and the viscosity temperature coefficient which is defined as $$1 - \frac{\text{viscosity at } 210° \text{F.}}{\text{viscosity at } 100° \text{F.}}$$

was then determined by substituting the values for the respective viscosities in such a formula. It was found that the viscosity at 100° F. was 701.5 centistokes and the viscosity at 210° F. was 493.6 centistokes. It is thus apparent that $$1 - \frac{493.6}{701.5} = 0.296$$

viscosity temperature coefficient. This viscosity temperature coefficient is very low and makes such fluids described above and in the instant application eminently suitable as hydraulic fluids.

EXAMPLE 2

In this example, 10 parts, by weight, of copper sebacate was mixed thoroughly with the methyl phenyl polysolixane described above in Example 1 using the same procedure as described in connection with incorporating the aluminum sebacate in the same methyl phenyl silicone oil whereby the copper sebacate comprised about 10 per cent of the total weight of the latter and the liquid methyl phenyl polysiloxane. The viscosity of this mixture of ingredients was then measured in a rotational viscometer revolving at a rate of about 400 R. P. M. The measurement of the viscosity was in centipoises and was converted to centistokes by determining the density of the liquid at two temperatures, namely, 1.13 at 28° C. and 1.07 at 99° C. and using these two points as a straight line graph formation from which were read off the densities at intermediate temperatures thus permitting conversion of the viscosities from centipoises to centistokes. The calculated densities and viscosities in centistokes at the various temperatures are described below in the table.

Table

| Temperature, ° F. | Density | Viscosity/Centistokes 400 R. P. M. |
|---|---|---|
| 86 | 1.128 | 634 |
| 104 | 1.120 | 418 |
| 113 | 1.116 | 352 |
| 122 | 1.111 | 296 |
| 131 | 1.107 | 253 |
| 140 | 1.103 | 222 |
| 149 | 1.099 | 207 |
| 158 | 1.095 | 188 |
| 167 | 1.090 | 170 |
| 176 | 1.086 | 149 |
| 194 | 1.078 | 126 |
| 212 | 1.070 | 108.5 |

From the above values in the table, it will be evident that plotting the values on a standard viscosity-temperature chart yields a straight line figure similar to a methyl polysiloxane oil plotted under the same conditions of temperature. Calculation of the viscosity-temperature coefficient using the formulation mentioned above gave a value of about 0.75 for the mixture of the methyl phenyl silicone oil and the copper sebacate, as contrasted to the viscosity-temperature coefficient for the methyl phenyl polysiloxane oil alone of 0.83. The viscosity-temperature coefficient of a straight methyl polysiloxane oil having approximately an equivalent organic, namely, a methyl, to silicon ratio, is about 0.64.

It will, of course, be apparent to those skilled in the art that other concentrations of preferably below 15 per cent, by weight, copper or aluminum sebacate, may be employed without departing from the scope of the invention. In addition, various types of liquid methyl phenyl polysiloxanes, many of which are described in the aforementioned Patnode patents, may be used in place of the specific methyl phenyl silicone oil described in the foregoing example. Generally, it is desirable that there be from about 50 to 95 mol percent methyl groups and from 5 to 50 mol percent phenyl groups in the methyl phenyl polysiloxane. Various other additives, for instance, oxidation inhibitors, etc., may also be incorporated in the compositions herein described.

In addition to being eminently suitable as hydraulic fluids, the compositions disclosed and claimed in the present application are also useful as lubricants where extremes in temperature may be encountered. The use of this type of lubricant wherein the viscosity of the latter changes comparatively little over a large temperature range, is especially desirable in applications where high temperatures may be encountered. The fluids herein described tend to retain narrow viscosity values over wide temperature ranges so that maintenance of the lubricating film between the surfaces being lubricated is more readily accomplished.

What I claim as new and desire to secure by Letters Patent of the United States is:

1. A liquid composition of matter having a low viscosity-temperature coefficient consisting essentially of (1) a liquid methyl phenylpolysiloxane containing an average of from about 2.0 to 2.25 total methyl and phenyl groups per silicon atom and (2) from 5 to 15%, by weight, based on the weight of the aforesaid methyl phenylpolysiloxane of an organometallic salt selected from the class consisting of copper and aluminum sebacates.

2. A liquid having a low viscosity temperature coefficient consisting essentially of (1) a liquid methyl phenylpolysiloxane containing an average of from about 2.0 to 2.25 total methyl and phenyl groups per silicon atom and (2) from 5 to 15%, by weight, aluminum sebacate, based on the weight of the liquid methyl phenylpolysiloxane.

3. A liquid composition having a low viscosity temperature coefficient consisting essentially of (1) a liquid methyl phenylpolysiloxane containing an average from about 2.0 to 2.25 total methyl and phenyl groups per silicon atom and (2) from 5 to 15%, by weight, copper sebacate, based on the weight of the methyl phenylpolysiloxane.

References Cited in the file of this patent

UNITED STATES PATENTS

| Number | Name | Date |
|---|---|---|
| 2,349,817 | Farrington et al. | May 30, 1944 |
| 2,642,395 | Currie | June 16, 1953 |